United States Patent
Hirotsune et al.

(10) Patent No.: US 9,448,673 B2
(45) Date of Patent: Sep. 20, 2016

(54) TOUCH DETECTION DEVICE, TOUCH PANEL, AND IMAGE DISPLAY DEVICE

(71) Applicant: Panasonic Liquid Crystal Display Co., Ltd., Himeji-shi, Hyogo (JP)

(72) Inventors: Satoshi Hirotsune, Hyogo (JP); Akihiro Yamamura, Osaka (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 14/192,287

(22) Filed: Feb. 27, 2014

(65) Prior Publication Data

US 2015/0035793 A1  Feb. 5, 2015

(30) Foreign Application Priority Data

Jul. 30, 2013  (JP) .................. 2013-157949

(51) Int. Cl.
*G06F 3/044* (2006.01)
*G06F 3/041* (2006.01)
*G06F 3/0354* (2013.01)

(52) U.S. Cl.
CPC ........... *G06F 3/044* (2013.01); *G06F 3/03545* (2013.01); *G06F 3/0416* (2013.01)

(58) Field of Classification Search
CPC ... G06F 3/044; G06F 3/0416; G06F 3/03545
USPC ......................................................... 345/173
See application file for complete search history.

(56) References Cited

U.S. PATENT DOCUMENTS

2008/0238885 A1* 10/2008 Zachut et al. ................ 345/174
2011/0155479 A1*  6/2011 Oda et al. ................... 178/18.06

FOREIGN PATENT DOCUMENTS

| JP | 58-182743  | 10/1983 |
| JP | 2010-061351 | 3/2010 |
| JP | 2012-168747 | 9/2012 |
| JP | 2013/069290 | 5/2013 |

* cited by examiner

*Primary Examiner* — Sahlu Okebato
(74) *Attorney, Agent, or Firm* — Hamre, Schumann, Mueller & Larson P.C.

(57) ABSTRACT

Provided is a touch detection device, including: a plurality of resonant circuits arranged along a touch detection surface; an input signal line for inputting, to each of the plurality of resonant circuits, an input signal for causing resonance; and a detecting unit for detecting frequencies of a plurality of output signals output from the plurality of resonant circuits.

7 Claims, 9 Drawing Sheets

TOUCH DETECTION DEVICE, TOUCH PANEL, AND IMAGE DISPLAY DEVICE

CROSS-REFERENCE TO RELATED APPLICATION

The present application claims priority from Japanese application JP 2013-157949 filed on Jul. 30, 2013, the content of which is hereby incorporated by reference into this application.

TECHNICAL FIELD

The present invention relates to a touch detection device, a touch panel, and an image display device.

BACKGROUND

A touch detection device and a touch panel, which are configured to detect a touch operation performed by a user with respect to a touch detection surface, are provided in, for example, a portable communication terminal such as a smartphone and a tablet terminal, and an information processing apparatus that is installed in stores so as to provide services corresponding to operations performed by customers.

In such a touch detection device and touch panel, a capacitive method is known as a method of detecting a touch operation performed by a user. The capacitive method is a method of detecting the touch operation by arranging a plurality of electrodes along the touch detection surface, and detecting a change in capacitance between the electrodes caused by approach of, for example, a finger of the user.

Japanese Patent Application Laid-open No. 2010-61351 discloses an information input apparatus that determines, based on a timing at which an integrated amount of currents generated during the touch detection reaches a predetermined value, whether the touch is performed with use of a finger or a stylus pen, relating to a technology of performing touch detection by the capacitive method.

In the capacitive method, the touch operation is detected based on the magnitude of the amplitude of a signal representing the integrated amount of currents, but the signal amplitude may vary due to noise. Therefore, when a configuration for detecting the operation is provided to, for example, a display device, false detection may occur due to display noise caused by a display element provided nearby.

Further, when determining whether the detected touch operation is performed with use of a stylus pen or a finger (stylus pen/finger determination), the determination is made based on, for example, an area of a region in which the touch operation is detected. However, in the case of such a method, incorrect determination may be made, such as an operation using only a leading end portion of the finger is determined as an operation using a stylus pen.

The present invention has been made in view of the above-mentioned problems, and has an object to provide a touch detection device, a touch panel, and an image display device that are less affected by noise and are capable of executing stylus pen/finger determination with higher accuracy.

SUMMARY

In order to solve the above-mentioned problems, a touch detection device according to one embodiment of the present invention includes: a plurality of resonant circuits arranged along a touch detection surface; a signal input unit for inputting, to each of the plurality of resonant circuits, an input signal for causing resonance; and a detecting unit for detecting frequencies of a plurality of output signals output from the plurality of resonant circuits.

According to the embodiment of the present invention, the touch detection device that detects the frequencies of the output signals from the plurality of resonant circuits arranged along the touch detection surface is provided.

Further, according to one embodiment of the present invention, the touch detection device further includes a comparing unit for comparing each of the frequencies of the plurality of output signals detected in the detecting unit with a predetermined threshold value; and a variation detection signal generating unit for generating, based on a comparison result in the comparing unit, a variation detection signal for identifying a resonant circuit in which frequency variation of an output signal is detected.

According to the embodiment of the present invention, the touch detection device that generates the variation detection signal for identifying the resonant circuit in which frequency variation of the output signal is detected is provided.

Further, according to one embodiment of the present invention, the touch detection device further includes a stylus pen operation detection signal generating unit for generating, when the comparing unit determines that at least one of the frequencies of the plurality of output signals is smaller than the predetermined threshold value, a stylus pen operation detection signal that represents detection of an operation by a user with use of a stylus pen.

According to the embodiment of the present invention, the touch detection device that detects an operation using the stylus pen based on the comparison result between the frequency of the output signal of the resonant circuit and the predetermined threshold value is provided.

Further, according to one embodiment of the present invention, the touch detection device further includes a finger operation detection signal generating unit for generating, when the comparing unit determines that at least one of the frequencies of the plurality of output signals is larger than the predetermined threshold value, a finger operation detection signal that represents detection of an operation by a user with use of a finger.

According to the embodiment of the present invention, the touch detection device that detects an operation using the finger based on the comparison result between the frequency of the output signal of the resonant circuit and the predetermined threshold value is provided.

Further, according to one embodiment of the present invention, the predetermined threshold value is set based on a resonant frequency of the each of the plurality of resonant circuits.

According to the embodiment of the present invention, the touch detection device that detects an operation based on the comparison result between the frequency of the output signal of the resonant circuit and the threshold value based on the resonant frequency of the resonant circuit is provided.

Further, according to one embodiment of the present invention, the touch detection device further includes: a comparing unit for comparing each of the frequencies of the plurality of output signals detected in the detecting unit with a first threshold value, and comparing the each of the frequencies of the plurality of output signals with a second threshold value; and a variation detection signal generating unit for generating, when the comparing unit determines that at least one of the frequencies of the plurality of output signals is one of smaller than the first threshold value and larger than the second threshold value, a variation detection signal for identifying a resonant circuit that outputs an output signal having a frequency that is determined to be one of smaller than the first threshold value and larger than the second threshold value.

According to the embodiment of the present invention, the touch detection device that generates the variation detection signal when the frequency of the output signal of the resonant circuit is smaller than the first threshold value, or when the frequency thereof is larger than the second threshold value is provided.

Further, according to one embodiment of the present invention, the touch detection device further includes an operation detection signal generating unit for generating, when the comparing unit determines that at least one of the frequencies of the plurality of output signals is smaller than the first threshold value, a stylus pen operation detection signal that represents detection of an operation by a user with use of a stylus pen, and for generating, when the comparing unit determines that at least one of the frequencies of the plurality of output signals is larger than the second threshold value, a finger operation detection signal that represents detection of an operation by a user with use of a finger.

According to the embodiment of the present invention, the touch detection device that detects an operation using the stylus pen when the frequency of the output signal of the resonant circuit is smaller than the first threshold value and detects an operation using the finger when the frequency thereof is larger than the second threshold value is provided.

Further, according to one embodiment of the present invention, the first threshold value and the second threshold value are set based on a resonant frequency of the each of the plurality of resonant circuits.

According to the embodiment of the present invention, the touch detection device that detects an operation based on the comparison result between the frequency of the output signal of the resonant circuit and the threshold value based on the resonant frequency of the resonant circuit is provided.

Further, according to one embodiment of the present invention, the touch detection device further includes means for acquiring positional information that represents a position of the each of the plurality of resonant circuits, in which the variation detection signal includes information that represents a position of a resonant circuit that outputs an output signals having a frequency that is determined to be one of smaller than a predetermined threshold value and larger than a predetermined threshold value.

According to the embodiment of the present invention, the touch detection device that generates the variation detection signal including the information that represents the position of the resonant circuit in which frequency variation is detected is provided.

Further, an image display device according to one embodiment of the present invention includes the above-mentioned touch detection device.

According to the embodiment of the present invention, the image display device including the touch detection device that detects the frequencies of the output signals from the plurality of resonant circuits arranged along the touch detection surface is provided.

Further, a touch panel according to one embodiment of the present invention includes: a plurality of resonant circuits provided along a touch detection surface; a plurality of input signal lines for inputting, to the plurality of resonant circuits, input signals for causing resonance; and a plurality of output signal lines for outputting output signals output from the plurality of resonant circuits, respectively.

According to the embodiment of the present invention, the touch panel including the plurality of resonant circuits provided along the touch detection surface is provided.

Further, according to one embodiment of the present invention, the plurality of input signal lines are each formed in a first direction along the touch detection surface, and the plurality of output signal lines are each formed in a second direction, which is different from the first direction, along the touch detection surface. Each of the plurality of resonant circuits is composed of an inductor and a capacitor that are connected to one of the plurality of input signal lines and one of the plurality of output signal lines.

According to the embodiment of the present invention, the touch panel that includes the input signal lines each formed in the first direction, the output signal lines each formed in the second direction, and the resonant circuits composed of the inductor and the capacitor connected to the input signal line and the output signal line is provided.

Further, according to one embodiment of the present invention, the plurality of input signal lines, the plurality of output signal lines, the inductor, and the capacitor are formed in a single transparent electrode material layer.

According to the embodiment of the present invention, the touch panel including the resonant circuits formed in the single transparent electrode material layer is provided.

Further, an image display device according to one embodiment of the present invention includes the above-mentioned touch panel.

According to the embodiment of the present invention, the image display device including the touch panel including the plurality of resonant circuits provided along the touch detection surface is provided.

DETAILED DESCRIPTION

First Embodiment

Figure 1:
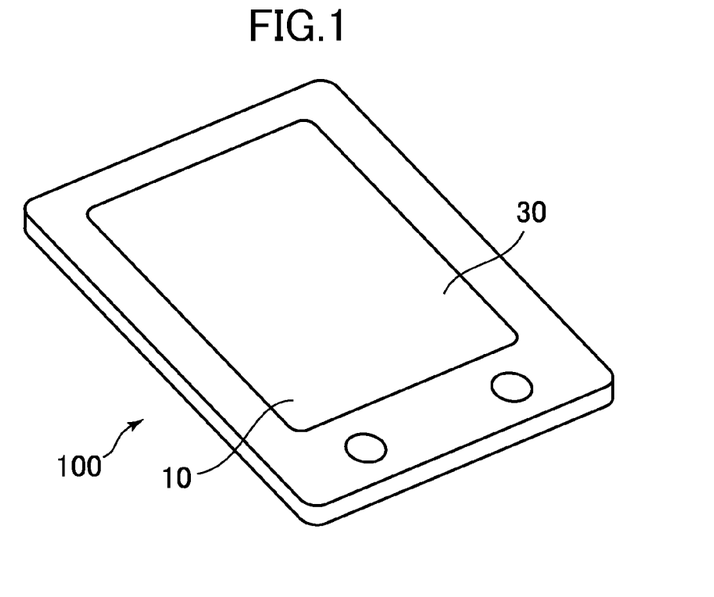
FIG. 1 is a view illustrating an information processing apparatus including a touch detection device and a touch panel according to a first embodiment of the present invention.

FIG. 1 is a view illustrating an information processing apparatus 100 including a touch detection device 20 and a touch panel 30 according to a first embodiment of the present invention. The information processing apparatus 100 includes a display unit (image display device) 10, and the touch panel 30 is provided to a display surface of the display unit 10. In this case, a touch detection surface of the touch panel 30 is provided along the display surface of the display unit 10. Further, the information processing apparatus 100 includes the touch detection device 20 (not shown) including the touch panel 30.

Figure 2:
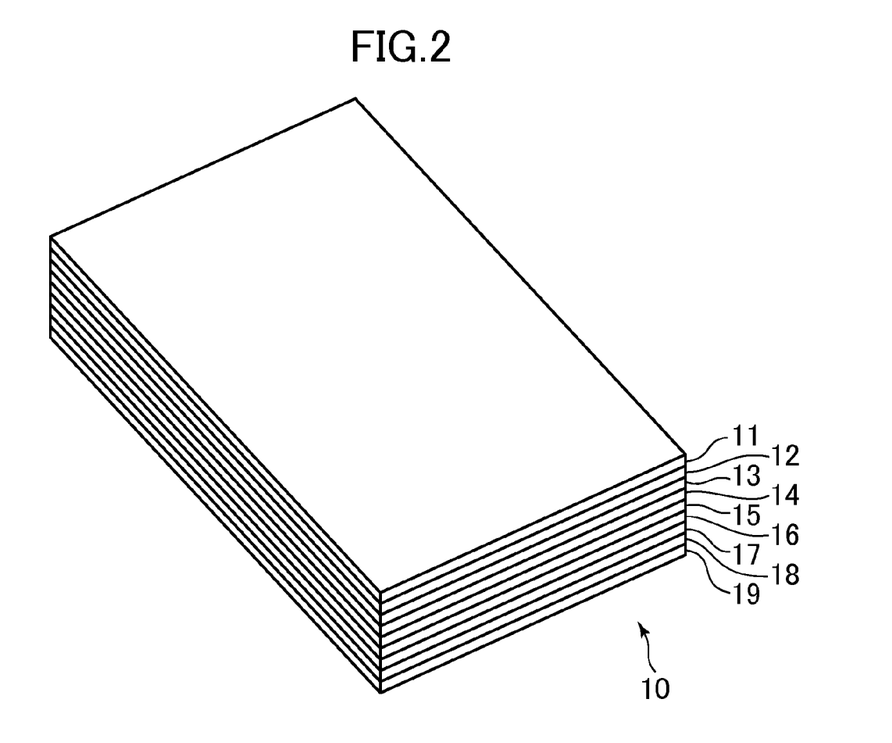
FIG. 2 is a view illustrating a configuration of a display unit according to the first embodiment of the present invention.

FIG. 2 is a view illustrating the configuration of the display unit 10 according to the first embodiment of the present invention. The display unit 10 includes a front glass 11, a polarizing plate 12, an ITO (indium tin oxide, transparent electrode material) layer 13, a color filter glass 14, a color filter 15, a liquid crystal layer 16, a TFT substrate 17, a polarizing plate 18, and a backlight unit 19. The touch panel 30 is formed in the ITO layer 13. The display unit 10 has a configuration similar to that of an existing liquid crystal display except for the ITO layer 13.

Figure 3:
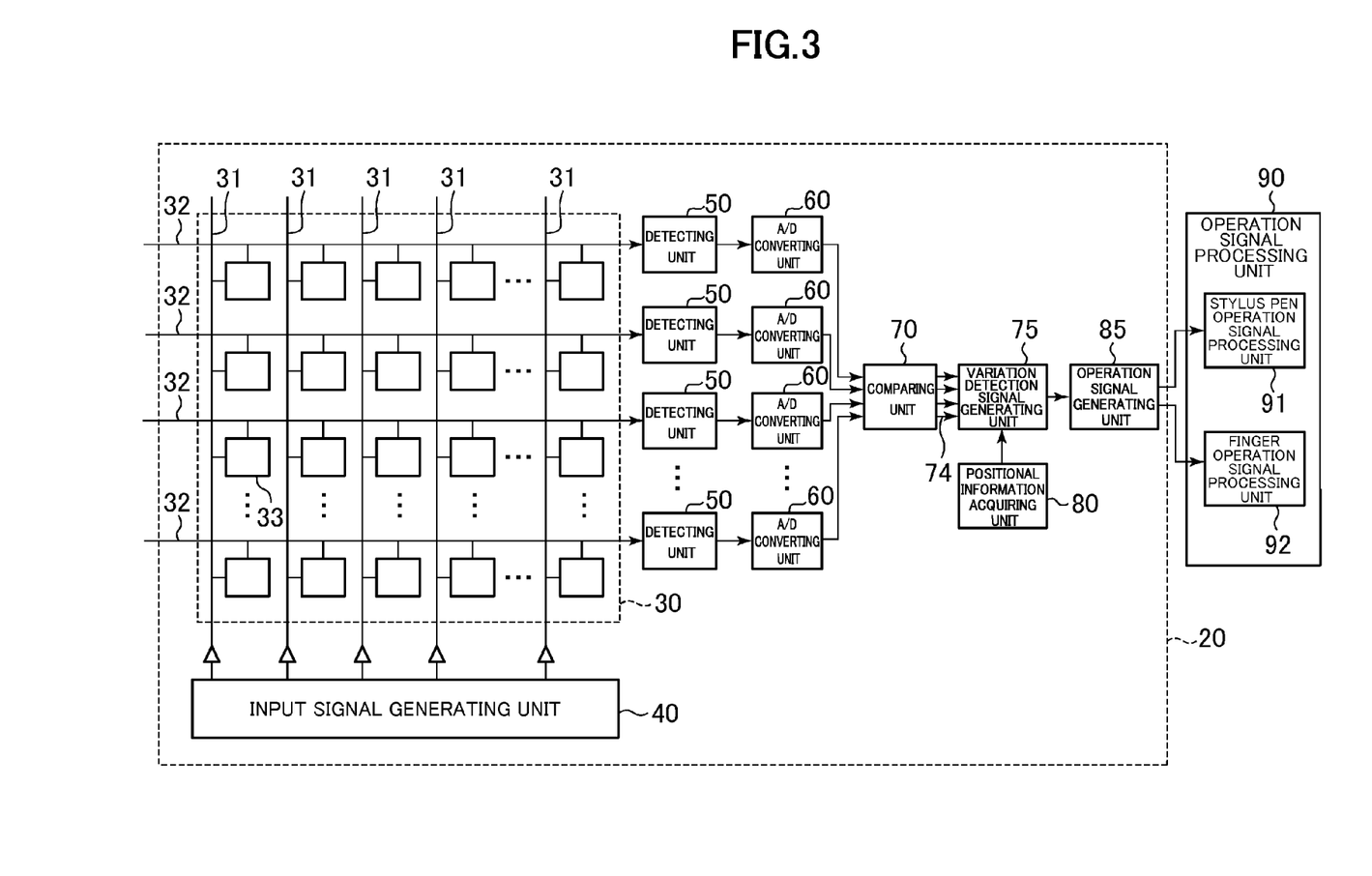
FIG. 3 is a diagram illustrating a configuration of the touch detection device according to the first embodiment of the present invention.

FIG. 3 is a diagram illustrating the configuration of the touch detection device 20 according to the first embodiment of the present invention. The touch detection device 20 includes the touch panel 30, an input signal generating unit 40, detecting units 50, A/D converting units 60, a comparing unit 70, a variation detection signal generating unit 75, a positional information acquiring unit 80, and an operation signal generating unit 85. The touch panel 30 includes a plurality of input signal lines 31 each formed in a first direction along the touch detection surface of the touch panel 30, a plurality of output signal lines 32 each formed in a second direction, which is different from the first direction, along the touch detection surface, and a plurality of resonant circuits 33 formed along the touch detection surface of the touch panel 30. The plurality of input signal lines 31, the plurality of output signal lines 32, and the plurality of resonant circuits 33 are formed in the single ITO layer 13. An operation signal output from the operation signal generating unit 85 is output to an operation signal processing unit 90 of the information processing apparatus 100.

Figure 4:
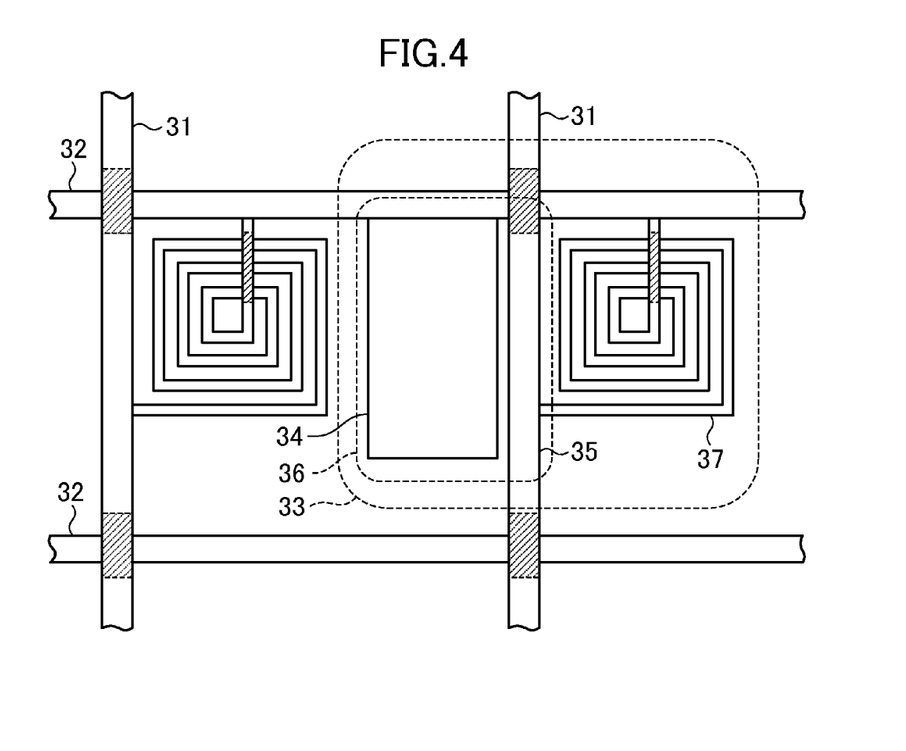
FIG. 4 is a view illustrating a configuration of a resonant circuit provided in the touch detection device according to the first embodiment of the present invention.

FIG. 4 is a view illustrating the configuration of the resonant circuit 33 provided in the touch detection device 20 according to the first embodiment of the present invention. The resonant circuit 33 includes a capacitor 36 composed of a first electrode 34 and a second electrode 35 and an inductor 37 that are each formed in the ITO layer 13. In this case, the second electrode 35 is formed of a part of the input signal line 31. Further, a hatched region in FIG. 4, in which wirings overlap with each other, is formed in a bridge configuration in which the wirings overlap with each other in an insulated manner.

Figure 5:
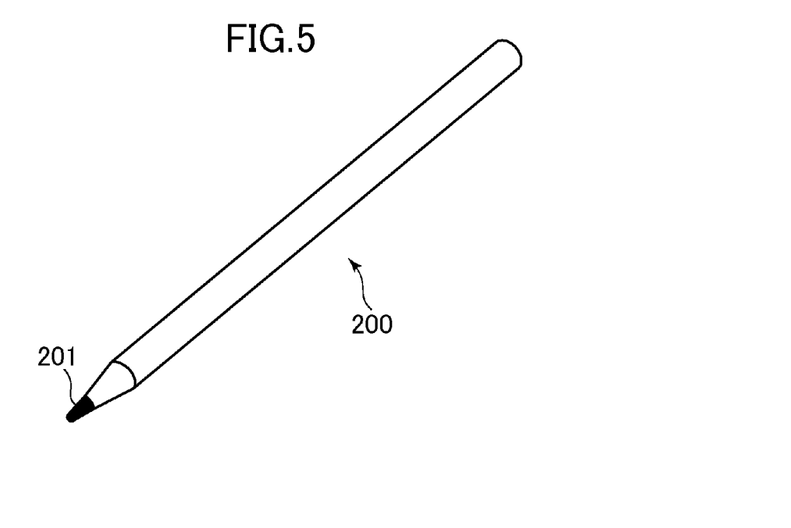
FIG. 5 is a view illustrating a stylus pen to be used for operating the touch detection device according to the first embodiment of the present invention.

FIG. 5 is a view illustrating a stylus pen 200 to be used for operating the touch detection device 20 according to the first embodiment of the present invention. The stylus pen 200 includes a contact part 201 at a leading end thereof, which is made of a ferromagnetic ferrite.

The operation of the touch detection device 20 is described below. The input signal generating unit 40 of the touch detection device 20 generates, for each of the plurality of resonant circuits 33, an input signal such as a pulse signal for causing resonance, and inputs the generated input signal to each of the plurality of resonant circuits 33 via the plurality of input signal lines 31.

Each of the resonant circuit 33 performs a resonant operation in response to the input signal input from the input signal generating unit 40 via the input signal line 31, and outputs an output signal via the output signal line 32 to the detecting unit 50. In this case, the frequency of the output signal reduces when the stylus pen 200 approaches the resonant circuit 33, and increases when a finger approaches the resonant circuit 33. Details thereof are described later.

Figure 6:
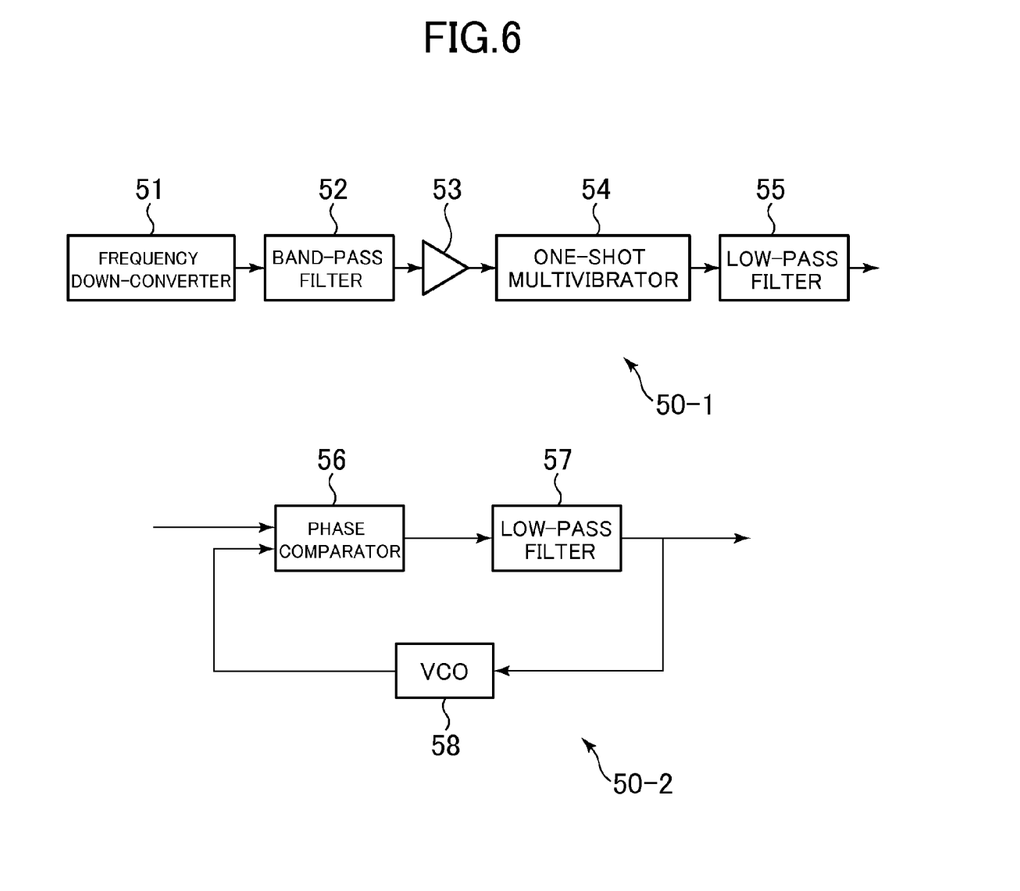
FIG. 6 is a diagram illustrating an example of a configuration of a detecting unit according to the first embodiment of the present invention.

The detecting units 50 execute detection processing of the plurality of output signals input from the plurality of resonant circuits 33 via the plurality of output signal lines 32, respectively, to detect the frequencies thereof. FIG. 6 is a diagram illustrating an example of the configuration of the detecting unit 50 according to the first embodiment of the present invention. A detecting unit 50-1 as a first configuration example performs detection processing by a pulse count method, and includes a frequency down-converter 51, a band-pass filter 52, a zero-crossing detector 53, a one-shot multivibrator 54, and a low-pass filter 55. A detecting unit 50-2 as a second configuration example performs detection processing by a PLL method, and includes a phase comparator 56, a low-pass filter 57, and a VCO (voltage controlled oscillator) 58. The detecting unit 50 outputs an analog signal representing the detection result to the A/D converting unit 60, and the A/D converting unit 60 coverts the analog detection result into a digital value and outputs the digital value to the comparing unit 70.

The comparing unit 70 compares, with a predetermined threshold value, each of the frequencies of the plurality of output signals detected in the detecting units 50, which have been digitally converted in the A/D converting units 60, and outputs comparison result information representing the comparison result (larger/smaller than the predetermined threshold value) to the variation detection signal generating unit 75.

The variation detection signal generating unit 75 generates, based on the comparison result information input from the comparing unit 70, a variation detection signal including information for identifying the resonant circuit 33 in which a frequency of an output signal has varied and information representing the details of the variation, and outputs the generated variation detection signal to the operation signal generating unit 85. Prior to the generation of the variation detection signal, the positional information acquiring unit 80 acquires positional information representing the position of each of the resonant circuits 33 from a storage unit (not shown) such as a memory. The variation detection signal generating unit 75 acquires, from the positional information acquiring unit 80, the positional information of the resonant circuit 33 in which a frequency has varied, and outputs, as the information for identifying the resonant circuit 33 in the variation detection signal, information representing the position of the resonant circuit 33 in which the frequency of the output signal has varied to the operation signal generating unit 85.

The operation signal generating unit 85 generates, based on the variation detection signal input from the variation detection signal generating unit 75, a stylus pen operation signal representing a position at which the touch operation using the stylus pen 200 has been detected or a finger operation signal representing a position at which an operation using a finger has been detected, and outputs the generated stylus pen operation signal or finger operation signal to the operation signal processing unit 90.

The operation signal processing unit 90 executes, based on the stylus pen operation signal or the finger operation signal, processing corresponding to the operation. The operation signal processing unit 90 includes a stylus pen operation signal processing unit 91 for performing processing based on the stylus pen operation signal and a finger operation signal processing unit 92 for performing processing based on the finger operation signal.

In the following, a touch detection operation in the touch detection device 20 is described in detail. First, an operation of the touch detection device 20 under a state in which no touch operation is performed is described.

Under a state in which neither a finger nor the stylus pen 200 approaches the resonant circuit 33 of the touch detection device 20, the resonant circuit 33 performs a resonant operation. When an inductance of the inductor of the resonant circuit 33 is represented by L (H), and a capacitance of the capacitor is represented by C (F), a resonant frequency f of the resonant circuit 33 is represented by the following expression (1).

$$f = \frac{1}{2\pi\sqrt{LC}} \quad (1)$$

When neither the finger nor the stylus pen 200 approaches the resonant circuit 33, the resonant circuit 33 outputs an output signal having a resonant frequency (hereinafter referred to as $f_0$) calculated by assigning L and C to the expression (1), and the detecting unit 50 detects the frequency $f_0$ as the frequency of the output signal.

Figure 7:
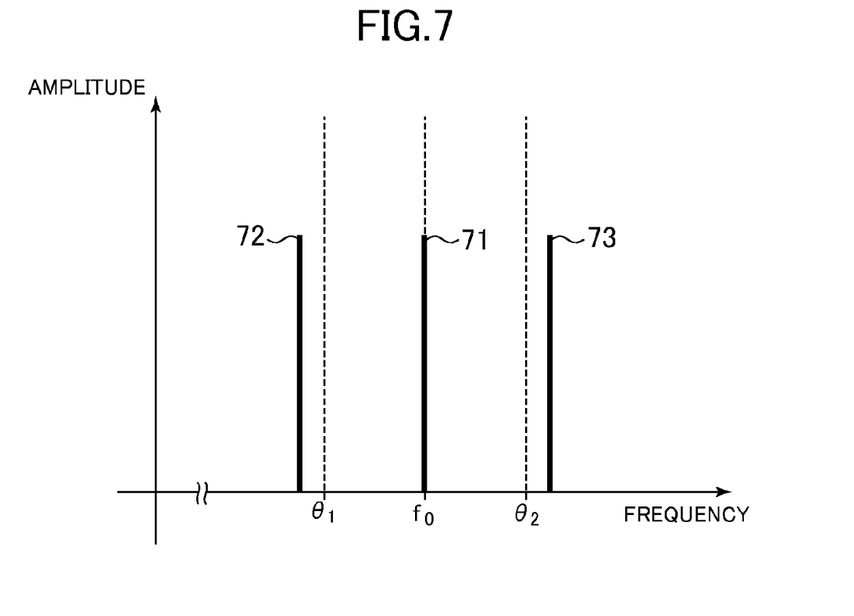
FIG. 7 is a graph showing details of comparison processing performed in a comparing unit.

The comparing unit 70 compares the frequency output from the detecting unit 50 with the predetermined threshold value. FIG. 7 is a graph showing details of comparison processing performed in the comparing unit 70. The comparing unit 70 compares the frequency detected in the detecting unit 50 with each of a first threshold value $\theta_1$ and a second threshold value $\theta_2$. In this case, the first threshold value $\theta_1$ and the second threshold value $\theta_2$ are values determined based on the resonant frequency $f_0$ calculated in advance for the resonant circuit 33 that outputs the output signal as a comparison target, and the values are set in advance. For example, the first threshold value $\theta_1$ is a value corresponding to 90% of the resonant frequency $f_0$, and the second threshold value $\theta_2$ is a value corresponding to 110% of the resonant frequency $f_0$.

When the comparing unit 70 determines that the frequency of the output signal of the resonant circuit 33 (frequency as the comparison target) is equal to or smaller than the first threshold value $\theta_1$, or determines that the frequency is equal to or larger than the second threshold value $\theta_2$, the comparing unit 70 outputs a signal representing the determination result to the operation signal generating unit 85. For example, the comparing unit 70 and the variation detection signal generating unit 75 are connected to each other by a plurality of signal lines 74 provided as many as the resonant circuits 33 so as to correspond to each of the resonant circuits 33. When the frequency of the signal output from any one of the resonant circuits 33 is equal to or smaller than the first threshold value $\theta_1$, the comparing unit 70 outputs a pulse (hereinafter referred to as "first pulse") having a predetermined waveform via the signal line 74 corresponding to the resonant circuit 33, and when the frequency is equal to or larger than the second threshold value $\theta_2$, the comparing unit 70 outputs a pulse (hereinafter referred to as "second pulse") having a waveform different from the above-mentioned predetermined waveform via the same signal line 74.

When neither the finger nor the stylus pen 200 approaches the resonant circuit 33, as described above, the frequency of the output signal is the resonant frequency $f_0$, and the frequency is larger than the first threshold value $\theta_1$ and smaller than the second frequency $\theta_2$ (signal 71 of FIG. 7). Therefore, the comparing unit 70 outputs neither the first pulse nor the second pulse. Therefore, the variation detection signal generating unit 75 does not generate the variation detection signal, and the operation signal generating unit 85 generates neither the finger operation signal nor the stylus pen operation signal.

Next, a case where an operation is performed with use of the stylus pen 200 is described. When an operation is performed with use of the stylus pen 200, electromagnetic induction occurs in the inductor 37 of the resonant circuit 33 due to approach of the contact part 201 of the stylus pen 200, and thus the inductance L increases. As a result, based on the expression (1), the frequency detected by the detecting unit 50 becomes smaller than $f_0$.

When the frequency as the comparison target is smaller than the first threshold value $\theta_1$ (signal 72 of FIG. 7), the comparing unit 70 outputs the first pulse to the signal line 74 corresponding to the resonant circuit 33 in which the frequency is detected.

The variation detection signal generating unit 75 generates, based on the input from the comparing unit 70, the variation detection signal including details of the variation (the fact that the frequency is smaller than the first threshold value $\theta_1$), and information representing the position of the resonant circuit 33 in which the variation is detected, and outputs the generated variation detection signal to the operation signal generating unit 85.

Then, the operation signal generating unit 85 generates, based on the input from the variation detection signal generating unit 75, the stylus pen operation signal representing the fact that the operation has been performed with use of the stylus pen 200 and the position of the detection, and outputs the generated stylus pen operation signal to the operation signal processing unit 90.

Next, a case where an operation is performed with use of a finger is described. When an operation is performed with use of a finger, a part of an electric field generated in the capacitor 36 of the resonant circuit 33 is absorbed by the finger, and as a result, the capacitance C of the capacitor 36 is reduced. As a result, based on the expression (1), the frequency detected by the detecting unit 50 becomes larger than $f_0$.

When the frequency as the comparison target is larger than the second threshold value $\theta_2$ (signal 73 of FIG. 7), the comparing unit 70 outputs the second pulse to the signal line 74 corresponding to the resonant circuit 33 in which the frequency is detected.

The variation detection signal generating unit 75 generates, based on the input from the comparing unit 70, the variation detection signal including details of the variation (the fact that the frequency is larger than the second threshold value $\theta_2$) and information representing the position of the resonant circuit 33 in which the variation is detected, and outputs the generated variation detection signal to the operation signal generating unit 85.

Then, the operation signal generating unit 85 generates, based on the input from the variation detection signal generating unit 75, the finger operation signal representing the fact that the operation has been performed with use of a finger and the position of the detection, and outputs the generated finger operation signal to the operation signal processing unit 90.

With the above-mentioned configuration, the touch detection device 20 and the touch panel 30 in which touch operation detection and stylus pen/finger determination are performed based on the frequency output from the resonant circuit 33 are provided.

In this configuration, the touch operation is detected based on the frequency of the output signal output from the resonant circuit 33. Frequency less varies due to noise, and hence with this configuration, as compared to the conventional-art configuration in which the touch operation is detected based on the signal amplitude, false detection due to noise occurs less frequently.

Further, in this configuration, the stylus pen/finger determination is performed based on the direction of frequency variation (increase/decrease), and hence, as compared to the conventional-art configuration in which the stylus pen/finger determination is performed based on the area of the region in which the touch operation has been detected, the stylus pen/finger determination is executed with higher accuracy.

Further, in this configuration, the stylus pen 200 to be used for the touch operation can perform the touch operation as long as the stylus pen 200 includes the contact part 201 formed of a ferromagnetic body. Therefore, it is unnecessary to provide the stylus pen 200 with, for example, a power source or a configuration for generating a signal for the touch operation, and thus the lightweight stylus pen 200 can be achieved in low cost.

Second Embodiment

Figure 8:
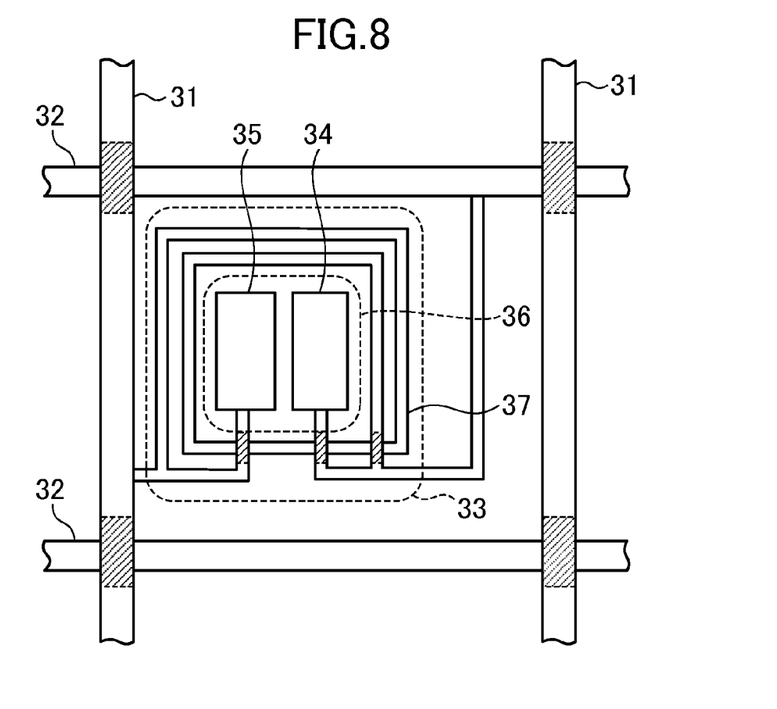
FIG. 8 is a view illustrating a configuration of a resonant circuit according to a second embodiment of the present invention.

Next, a second embodiment of the present invention is described. This embodiment is the same as the first embodiment except for the configuration of the resonant circuit 33. FIG. 8 is a view illustrating the configuration of the resonant circuit 33 according to the second embodiment of the present invention. In this embodiment, the resonant circuit 33 includes the inductor 37, and the capacitor 36 that is formed in the center part of the inductor 37 and composed of the first electrode 34 and the second electrode 35. Further, similarly to the first embodiment, a hatched region in FIG. 8, in which wirings overlap with each other, is formed in a bridge configuration in which the wirings overlap with each other in an insulated manner.

Third Embodiment

Figure 9:
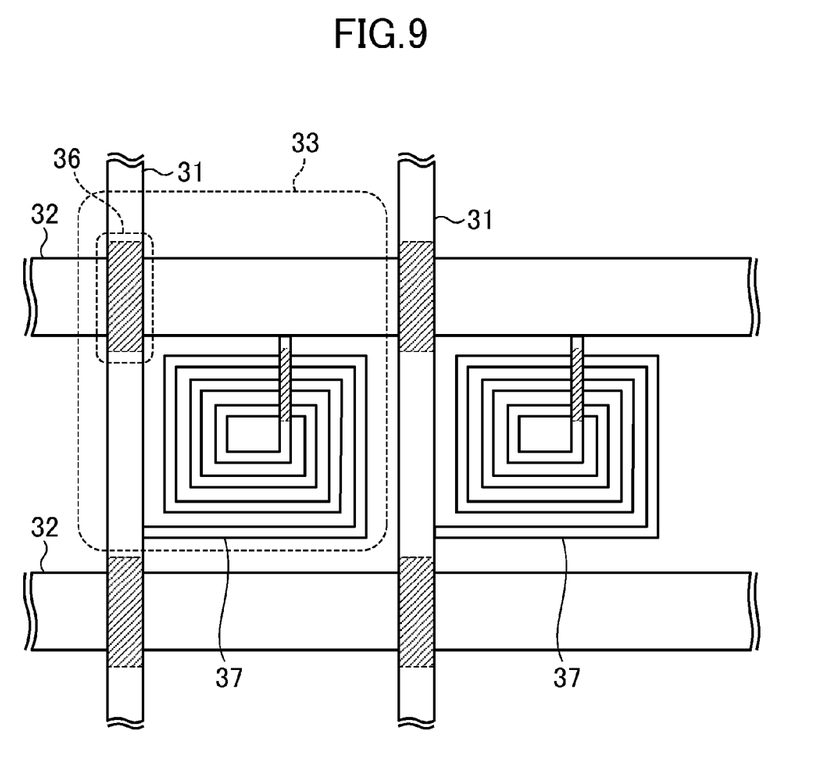
FIG. 9 is a view illustrating a configuration of a resonant circuit according to a third embodiment of the present invention.

Next, a third embodiment of the present invention is described. This embodiment is the same as the first and second embodiments except for the configuration of the resonant circuit 33. FIG. 9 is a view illustrating the configuration of the resonant circuit 33 according to the third embodiment of the present invention. In this embodiment, the resonant circuit 33 includes the inductor 37, and the capacitor 36 composed of a part of the input signal line 31 and a part of the output signal line 32 that overlap with each other. Further, similarly to the first and second embodiments, a hatched region in FIG. 9, in which wirings overlap with each other, is formed in a bridge configuration in which the wirings overlap with each other in an insulated manner.

Fourth Embodiment

Next, a fourth embodiment of the present invention is described. In this embodiment, the ITO layer 13 includes two layers (upper layer and lower layer). This embodiment is the same as the first to third embodiments except for the structure of the ITO layer 13 and the configuration of the resonant circuit 33.

Figure 10:
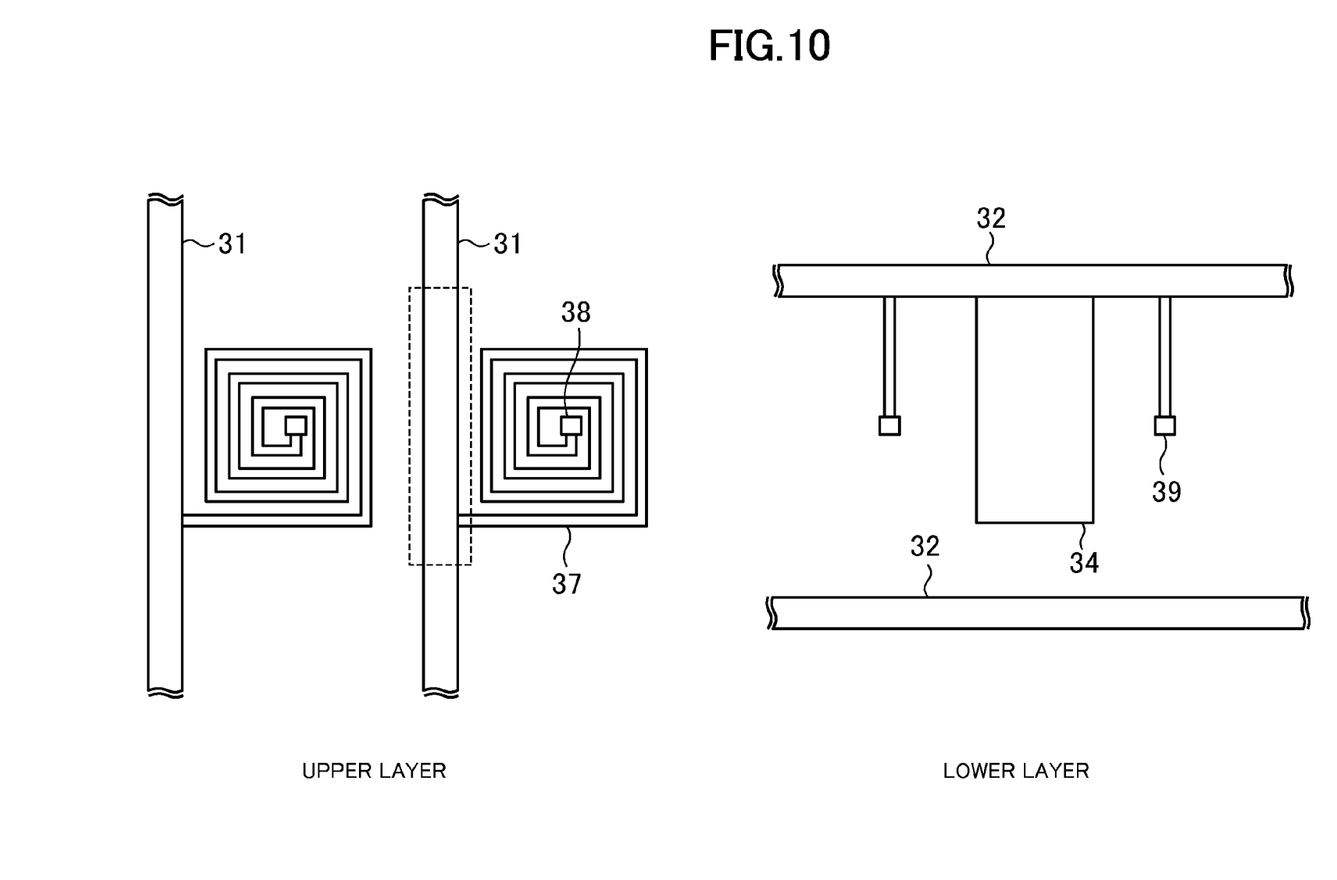
FIG. 10 is a view illustrating a configuration of a resonant circuit according to a fourth embodiment of the present invention.

FIG. 10 is a view illustrating the configuration of the resonant circuit 33 according to the fourth embodiment of the present invention. In this embodiment, the ITO layer 13 has a structure in which the upper layer is formed on the lower layer, the upper layer and the lower layer each having a configuration illustrated in FIG. 10. In this embodiment, the resonant circuit 33 includes the inductor 37 formed in the upper layer of the ITO layer 13, and the capacitor 36 composed of the first electrode 34 formed in the lower layer of the ITO layer 13 and a part (represented by broken lines) of the the input signal line 31 formed in the upper layer of the ITO layer 13, which overlaps with the first electrode 34. The inductor 37 is connected to the output signal line 32 in the lower layer of the ITO layer 13 via contacts 38 and 39 that are electrically connected to each other.

Fifth Embodiment

Next, a fifth embodiment of the present invention is described. In this embodiment, similarly to the fourth embodiment, the ITO layer 13 includes two layers (upper layer and lower layer). This embodiment is the same as the first to third embodiments except for the structure of the ITO layer 13 and the configuration of the resonant circuit 33, and the same as the fourth embodiment except for the configuration of the resonant circuit 33.

Figure 11:
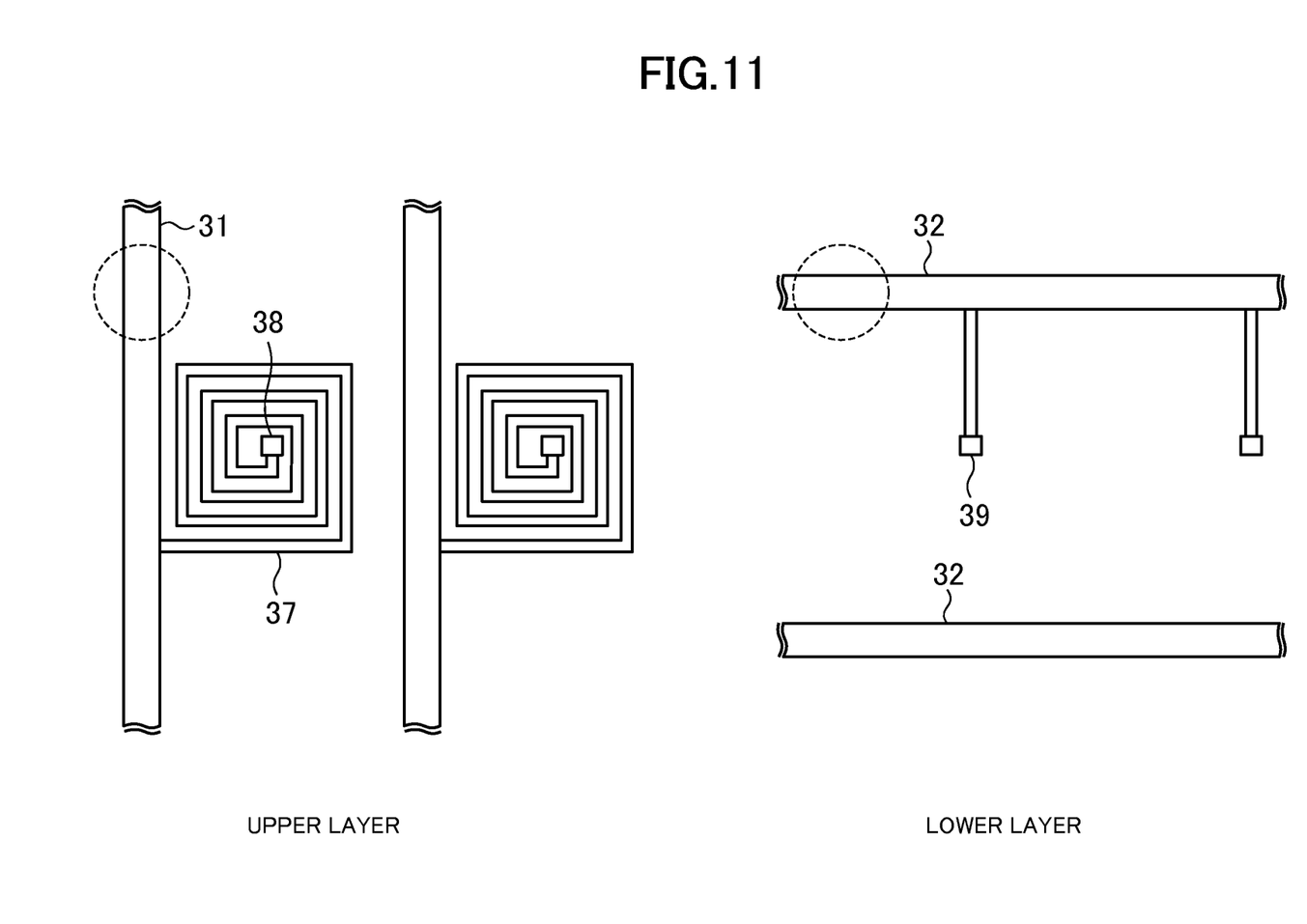
FIG. 11 is a view illustrating a configuration of a resonant circuit according to a fifth embodiment of the present invention.

FIG. 11 is a view illustrating the configuration of the resonant circuit 33 according to the fifth embodiment of the present invention. In this embodiment, the ITO layer 13 has a structure in which the upper layer is formed on the lower layer, the upper layer and the lower layer each having a configuration illustrated in FIG. 11. In this embodiment, the resonant circuit 33 includes the inductor 37 formed in the upper layer of the ITO layer 13, and the capacitor 36 composed of a part (represented by broken lines) of the input signal line 31 formed in the upper layer of the ITO layer 13 and a part (represented by broken lines) of the output signal line 32 formed in the lower layer of the ITO layer 13 that overlap with each other. The inductor 37 is connected to the output signal line 32 in the lower layer of the ITO layer 13 via the contacts 38 and 39 that are electrically connected to each other.

Figure 12:
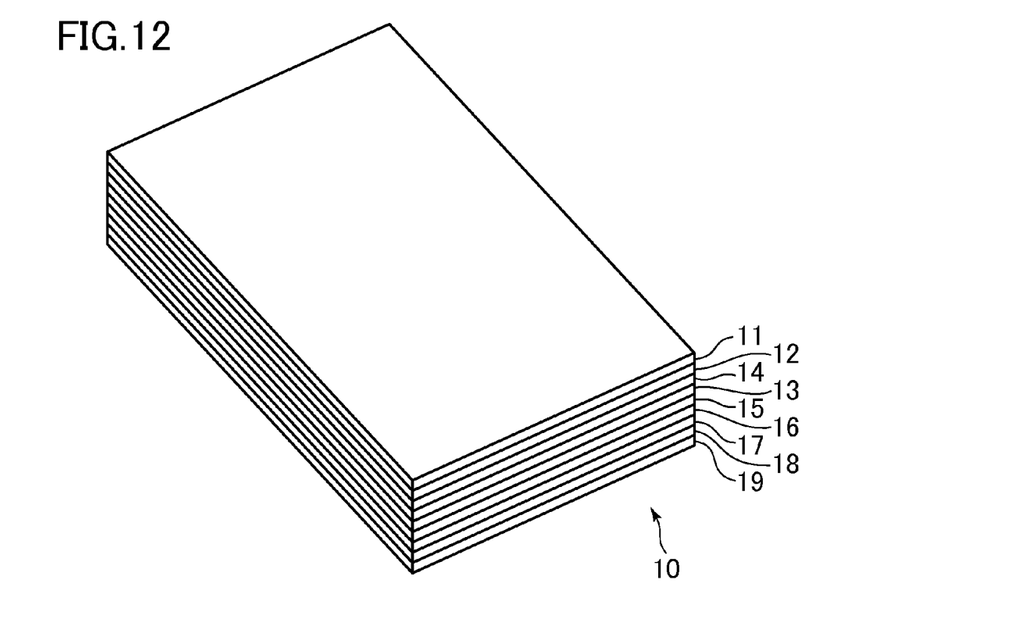
FIG. 12 is a view illustrating another embodiment of the present invention with respect to a position at which an ITO layer is formed.
Figure 13:
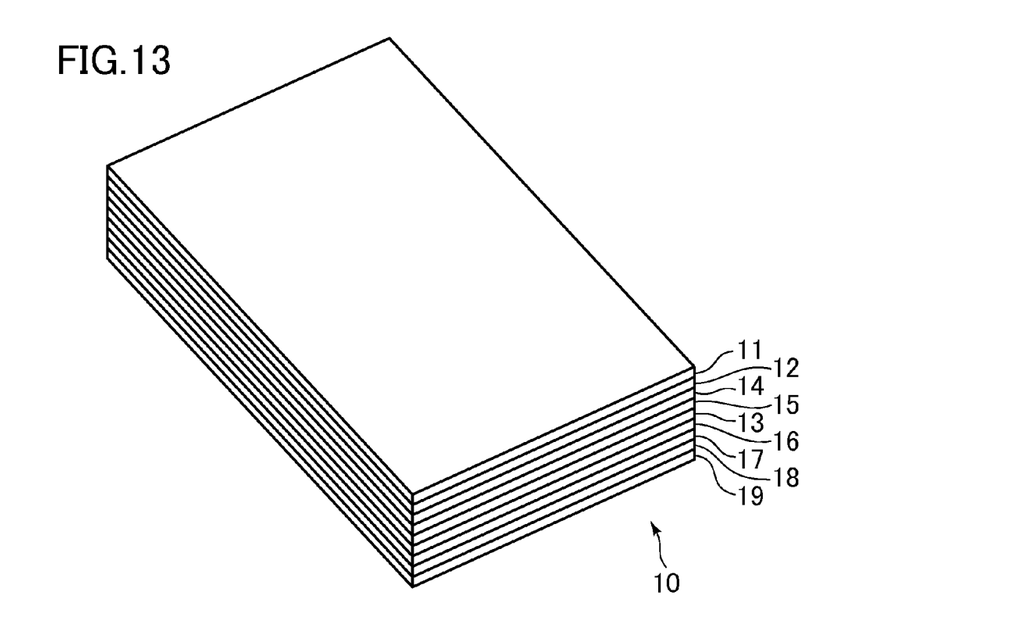
FIG. 13 is a view illustrating another embodiment of the present invention with respect to a position at which the ITO layer is formed.

Exemplary embodiments of the present invention have been described above, but the present invention is not limited to those embodiments. For example, in the above-mentioned respective embodiments, regarding the positional relationship between the ITO layer 13 that forms the resonant circuits 33 and other layers, the present invention is not limited to the configuration in which the ITO layer 13 is formed between the polarizing plate 12 and the color filter glass 14 as illustrated in FIG. 2. FIGS. 12 and 13 are views illustrating other embodiments of the present invention with respect to a position at which the ITO layer 13 is formed. That is, the ITO layer 13 may be formed between the color filter glass 14 and the color filter 15 as illustrated in FIG. 12, or may be formed between the color filter 15 and the liquid crystal layer 16 as illustrated in FIG. 13.

Further, in the above-mentioned embodiments, the touch detection device 20 and the touch panel 30 including a plurality of resonant circuits 33 each having a configuration illustrated in FIG. 4, 8, 9, 10, or 11 are disclosed, but the present invention is not limited thereto. The present invention may adopt a configuration in which the approach of a finger is detected based on an increase in frequency of the output signal of the resonant circuit 33, and another configuration in which the approach of a ferromagnetic body (stylus pen 200) is detected based on a decrease of the frequency. Further, the present invention is also applicable to other applications that require detection of the approach of at least one of the finger or the stylus pen 200.

Although the present invention has been described above by way of the embodiments, it should be understood that the present invention may encompass various structures with modifications within the range not departing from the gist thereof.

What is claimed is:

1. A touch panel, comprising: a plurality of resonant circuits provided along a touch detection surface;
   a plurality of input signal lines for inputting, to the plurality of resonant circuits, input signals for causing resonance;
   a plurality of output signal lines for outputting output signals output from the plurality of resonant circuits, respectively,
   a signal input unit for inputting, to each of the plurality of resonant circuits, an input signal for causing resonance;
   a detecting unit for detecting frequencies of a plurality of output signals output from the plurality of resonant circuits;
   a comparing unit for comparing each of the frequencies of the plurality of output signals detected in the detecting unit with a first threshold value, and comparing the each of the frequencies of the plurality of output signals with a second threshold value; and
   a variation detection signal generating unit for generating, when the comparing unit determines that at least one of the frequencies of the plurality of output signals is one of smaller than the first threshold value and larger than the second threshold value, a variation detection signal for identifying a resonant circuit that outputs an output signal having a frequency that is determined to be one of smaller than the first threshold value and larger than the second threshold value,
   wherein each of the plurality of resonant circuits includes:
      an inductor bridged between a corresponding one of the plurality of input signal lines and a corresponding one of the plurality of output signal lines; and
      a capacitor composed of a first electrode and a second electrode,
   wherein the first electrode is formed of a part of the corresponding one of the plurality of output signal lines or provided with the corresponding one of the plurality of output signal lines, and
   wherein the second electrode is formed of a part of the corresponding one of the plurality of input signal lines or provided with the corresponding one of the plurality of input signal lines.

2. The touch panel according to claim 1, wherein the plurality of input signal lines, the plurality of output signal lines, the inductor, and the capacitor are formed in a single transparent electrode material layer.

3. An image display device, comprising the touch panel according to claim 1.

4. The touch panel according to claim 1, further comprising an operation detection signal generating unit for generating, when the comparing unit determines that at least one of the frequencies of the plurality of output signals is smaller than the first threshold value, a stylus pen operation detection signal that represents detection of an operation by a user with use of a stylus pen, and for generating, when the comparing unit determines that at least one of the frequencies of the plurality of output signals is larger than the second threshold value, a finger operation detection signal that represents detection of an operation by a user with use of a finger.

5. The touch panel according to claim 1, wherein the first threshold value and the second threshold value are set based on a resonant frequency of the each of the plurality of resonant circuits.

6. The touch panel according to claim 1, further comprising means for acquiring positional information that represents a position of the each of the plurality of resonant circuits,
   wherein the variation detection signal comprises information that represents a position of a resonant circuit that outputs an output signals having a frequency that is determined to be one of smaller than a predetermined threshold value and larger than a predetermined threshold value.

7. The touch panel according to claim 1, wherein the plurality of input signal lines are each formed in a first direction along the touch detection surface,
   wherein the plurality of output signal lines are each formed in a second direction, which is different from the first direction, along the touch detection surface.

* * * * *